Oct. 26, 1965 V. P. DONNER 3,214,023
HYDRAULIC RESERVOIR AND FILTER
Filed April 4, 1962
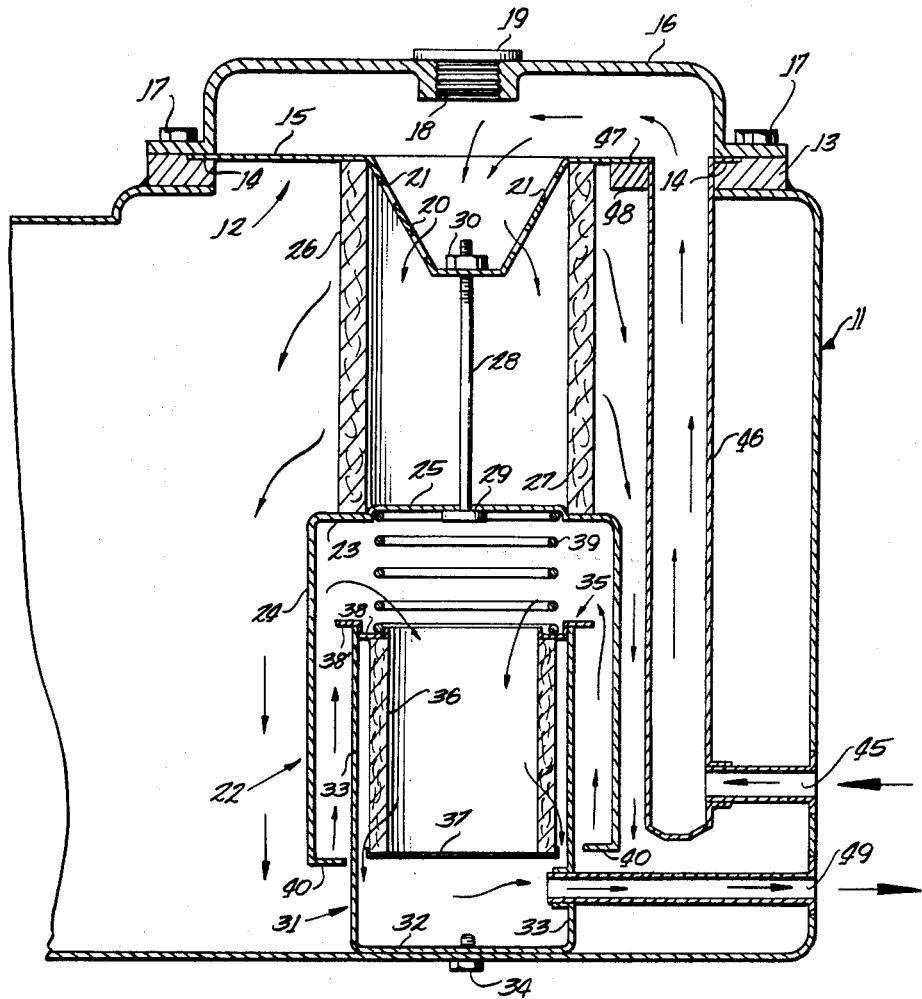

3,214,023
HYDRAULIC RESERVOIR AND FILTER
Verne P. Donner, Palatine, Ill., assignor to International Harvester Company, Chicago, Ill., a corporation of New Jersey
Filed Apr. 4, 1962, Ser. No. 185,082
4 Claims. (Cl. 210—172)

The present invention relates in general to a reservoir filtering system, and more particularly to a novel arrangement of parts which enables the filtering unit to be removed in one operation, and which provides a steady flow of fluid to a hydraulic system.

One of the most critical problems which has confronted designers of closed pressurized hydraulic systems has been the provision of a source of fluid which is free of agitation and does not introduce turbulence into the hydraulic system. It has been found that one of the major factors which introduces agitation into the system is that oil entering the reservoir through a filter usually enters at a high unit velocity, and splashes or otherwise disturbs the residuary fluid in the reservoir. An object of the present invention is therefore to provide a filter of micronic discrimination which reduces the unit velocity of the fluid flowing from the filter to such an extent that it merely oozes or flows slowly from the filter.

In an effective filtering system it is necessary that the filtering unit be easily removable so that the filters can be either cleaned or replaced. In prior art devices, it has been necessary to either drain the entire amount of fluid from the system, or to reach into the fluid to remove the filters. A further disadvantage that has been encountered in the use of known devices is that dirt and contaminants have exhibited a tendency to drift or fall back into the reservoir as the filters were being removed. It is therefore a further object of this invention to provide a simplified filter design which will function effectively, yet which will be subject to being easily extracted from the reservoir without introducing contaminants into the fluid.

Other objects and advantages of the invention will hereinafter become more fully apparent from the following description of the annexed drawing, which illustrates a preferred embodiment, and wherein:

The single figure is a vertical sectional view of a reservoir employing a preferred embodiment of the filtering unit.

Referring now to the drawing, there is shown in the single figure a hydraulic fluid storing reservoir indicated in its entirety by reference numeral 11. The upper portion of reservoir 11 is provided with an opening 12 through which the filtering unit is inserted and extracted. A shoulder member 13 is fixedly secured to the upper portion of reservoir 11, as by welding or the like, in surrounding relation with respect to opening 12. The upper surface of shoulder member 13 is provided with an annular groove 14 for reception of screen 15. A cover 16 is removably secured to reservoir 11 by bolts 17 or the like, so as to clamp screen 15 against shoulder member 13. Cover 16 is provided with an internally threaded hole 18 for reception of an externally threaded cap 19, which is removed when it is desired to add additional fluid to the reservoir.

Screen 15 is formed of a solid impervious sheet of material, except at its angularly recessed central portion 20, where a plurality of apertures 21 are provided to admit the fluid entering through opening 18, and the circulating fluid as will hereinafter become more apparent.

A cylindrical shell 22 having a unitary base 23 and a depending wall portion 24 is suspended within the reservoir. Base 23 is provided with an upraised portion 25 against which the inner wall 27 of filter cartridge 26 is seated. A clamping bolt 28 having a head portion 29 extending through an aperture in base 23, and having a threaded end portion extending through screen portion 20, is provided for integrally securing screen 15 to shell 22. It should be understood that by tightening the nut 30 on clamping bolt 28, filter cartridge 26 is pressed into intimate sealing relation with screen 15 and shell base 23.

A cylindrical casing 31 having a base 32 and an upwardly projecting wall portion 33, is fixedly secured to reservoir 11, as by bolt 34 or the like. Casing wall portion 33 is positioned in substantial vertical alignment with filter cartridge 26, and extends vertically to a point where it is positioned within wall portion 24 of shell 22.

A sealing cup 35 is provided at the upper end of casing wall portion 33, said sealing cup having a second filter cartridge 36 secured thereto and positioned within casing 31. Filter cartridge 36 is of the basket type, having a solid unitary base 37. Sealing cup 35 is provided with a recessed portion 38 in which one end of spring 39 is seated to press the cup into sealing relation with casing wall portion 33. Sealing cup 35 is further provided with an annular flange 38' which extends outwardly from casing wall portion 33, and which is engageable with the inwardly directed projections 40, provided at spaced-apart points around the periphery of wall portion 24, when shell 22 is moved vertically with respect to casing 31.

From the foregoing it should be apparent that when it is desired to clean or replace filter cartridges 26 or 36, it is necessary merely to remove cover 16, and lift the screen 15 from the reservoir. The engagement of bolt head 29 with shell base 23 will cause the shell 22 to follow the screen, and the engagement of projections 40 with flange 38' will cause filter cartridge 36 to follow screen 15 also. Thus, it will be noted that a simple filtering device has been provided which is removable as a unit without the necessity of draining the fluid from the reservoir, or immersing one's hand in the fluid. It should also be understood that the cooperation of base portion 25 and filter element wall 27, and the cooperation of base portion 37 with filter element 36 will together prevent the introduction of contaminants into the reservoir as the filtering unit is being extracted.

Reservoir 11 is provided with an inlet port 45 for reception of fluid under pressure from the hydraulic system. Inlet port 45 communicates with a substantially vertically extending tube 46 having its outwardly flared end portion 47 seated against, and extending through an opening in the inwardly directed portion 48 of shoulder 13. Reservoir 11 is further provided with an exhaust port 49 extending through wall portion 33 and communicating with the interior of casing 31.

As is indicated by the directional arrows, the fluid enters reservoir 11 through inlet port 45, is forced upward through tube 46, flows downward through apertures 21 and outward through filter cartridge 26 into the reservoir. A pump in the hydraulic system, not shown, draws the fluid from the reservoir upward around casing wall portion 33 where it flows downward through filter cartridge 36 and into the chamber formed at the bottom of casing 31, and thence through exhaust port 49 into the hydraulic system.

In order to reduce the unit velocity of the fluid as it emerges from filter cartridge 26, it has been found desirable to utilize a filtering element having micronic discrimination. For example, it has been found that filters having passages from 2–25 microns in size have reduced the unit velocity of ordinary hydraulic fluid to such an extent that it merely oozes slowly out of the filter.

It should be understood that what has been provided is a simple filter system, the working parts of which are easily removable as a unit from a reservoir. The filtering system contributes to a steady agitation-free flow of fluid by providing fluid velocity control as it enters the reservoir fluid. Obviously, many modifications and variations of the present invention are possible in the light of the above disclosure. It is therefore to be understood, that within the scope of the appended claims, the invention may be practiced otherwise than as specifically described.

What is claimed is:

1. For use in a reservoir having inlet and exhaust ports and a cover removably secured thereto, an improved extractable filtering device comprising a screen clamped between the reservoir and the cover, a shell adjacent said screen having a base and a wall portion depending downwardly therefrom, a connecting bolt securing said screen to the base of said shell, a first filter disposed between said screen and said base and in sealing relation with said base, a casing secured in the reservoir below and in substantial vertical alignment with said first filter, said casing having an upwardly projecting wall portion disposed within said downwardly depending shell wall portion, a cup engaging the upper end of said casing wall portion, said cup having a flange portion extending peripherally therearound and projecting outwardly from said casing wall portion, a second filter secured to said cup and disposed within said casing, said casing having an opening therein cooperating with the exhaust port, the lower end of said downwardly depending shell wall portion having inwardly directed projections engageable with said flange portion when said shell is moved vertically with respect to said casing enabling said first and second filters to be simultaneously removed from the reservoir, and spring means seated against said cup and said shell base to urge said cup into sealing engagement with said casing.

2. The invention set forth in claim 1 wherein said first filter is provided with fluid passages 2 to 25 microns in size to substantially reduce the unit velocity of the fluid flowing therethrough.

3. A filtering device for removing impurities from a flow of fluid in a hydraulic system comprising: a reservoir housing, a pair of hollow cylindrically shaped filters removably positioned in said housing, each including a solid bottom end portion, a substantially open top end portion and a porous side wall, means connecting said bottom section, top portion and porous side wall of each filter thereby forming a basket with an impervious bottom, said filters arranged sequentially in the flow of fluid so that fluid enters said open top end portion of one of said filters and exits through the porous side wall of said filter, the fluid having a unit flow path completely through each filter before entering another filter, said basket filters retaining the impurities within the filters; first means connected to the bottom of one of said filters; and second means connected to the top of the other of said filters, said first and second means arranged so that as the filter having the first means connected to the bottom thereof is removed from said housing said first means contacts said second means thereby operatively connecting said pair of filters together and allowing removal of all the filters from the hydraulic system as a single unit.

4. The filtering device as described in claim 3 wherein at least one of the pair of filters includes a fluid restricting side wall portion having passages from 2 to 25 microns in size to substantially reduce the unit velocity of the fluid flowing therethrough.

References Cited by the Examiner

UNITED STATES PATENTS

| | | | |
|---|---|---|---|
| 156,481 | 11/74 | Gentry | 210—336 |
| 582,467 | 5/97 | Franke | 210—316 X |
| 731,878 | 6/03 | Fischer | 210—336 |
| 898,545 | 9/08 | Barnes | 210—454 X |
| 1,223,299 | 4/17 | Taylor | 210—452 |
| 1,430,950 | 10/22 | Crandall | 210—336 X |
| 1,553,395 | 9/25 | Ressler et al. | 210—497 X |
| 1,817,572 | 8/31 | Linley et al. | 210—172 |
| 2,076,935 | 4/37 | Burckhalter | 210—254 X |
| 2,294,261 | 8/42 | Wilkinson | 210—232 X |
| 2,302,489 | 11/42 | Brown | 210—454 X |
| 2,474,161 | 6/49 | Pickard | 210—349 |
| 2,668,622 | 2/54 | Irving et al. | 210—316 X |
| 2,669,254 | 2/54 | Mork | 210—172 |
| 2,765,259 | 10/56 | Schwalge | 210—261 X |
| 2,933,192 | 4/60 | Gretzinger | 210—316 |
| 2,966,269 | 12/60 | Allen | 210—335 X |

REUBEN FRIEDMAN, *Primary Examiner.*

ROBERT F. BURNETT, *Examiner.*